March 10, 1970  F. J. GROSS ET AL  3,499,208

METHOD OF BEARING ALIGNMENT

Filed Sept. 29, 1967

Inventors
Frank J. Gross
John M. Horn

By John O. Hines
Attorney

# United States Patent Office 3,499,208
Patented Mar. 10, 1970

3,499,208
METHOD OF BEARING ALIGNMENT
Frank J. Gross and John M. Horn, York, Pa., assignors to Allis-Chalmers Manufacturing Company, Milwaukee, Wis.
Filed Sept. 29, 1967, Ser. No. 671,868
Int. Cl. B23p 19/00
U.S. Cl. 29—434                                            1 Claim

ABSTRACT OF THE DISCLOSURE

A method to provide alignment of crest gates to journal bearings. Support ribs are rigidly connected to the crest gate and are provided with bores larger than the outside diameter of the journal bearing pivot pins. Any misalignment of the gate and the pivot pins is accommodated by the oversized bore. Once the gate is roughly aligned on the pins, the oversized bore is filled with a liquid material which solidifies when cured which is poured into the cavity between the pins and the support ribs providing a solid connection therebetween.

---

With the ever increasing demand for electric power, companies operating hydraulic turbines are finding it more and more necessary to increase the supply of water to drive the turbines. One relatively simple and inexpensive manner of increasing water storage is to provide a gate across the top of the dam. This increases the amount of back water available to drive the turbines as well as for municipal water supply. Although the attachment of a crest gate to the top of a dam is a relatively simple project, certain problems do exist. Gates ranging in length up to eight hundred feet varying from two to eighteen feet damming height have been used. Since the gate must be pivoted to the top of the dam, it can be seen that the means of attaching the gate to the dam must be extremely accurate and free of excessive binding so that only a reasonable force is required to pivot the gate.

Because of the length and weight involved, a large number of pivot points are required. It is necessary that these pivot points or journals be accurately aligned so that excessive binding does not result. It is a relatively simple matter to level and accurately align the journal bearings to the top of the dam. On the other hand, it is considerably difficult to provide the bearing bores in the crest gate ribs so they will be accurately aligned with the journal bearings. One method of providing an accurately aligned pivot connection is to align the gate to the journal bearings and line bore the journal bearings and the ribs on the gate while the gate is held in the required position. However, it is readily discernible that it would be an extremely difficult and expensive operation to line bore a gate having a length of over five hundred feet.

It is therefore a general object of the subject invention to provide a simple and inexpensive method of bearing alignment for crest gates.

A more specific object of the invention is to provide a method of bearing alignment for a crest gate wherein the crest gate supporting ribs have an oversized bore which is roughly aligned with the supporting journal bearing pins and is then attached to the pins by pouring a liquid material which solidifies when cured into the cavity between the pins and the oversized bore.

These and other objects of the subject invention will become more fully apparent as the following description is read in light of the attached drawing in which.

Figure 1:
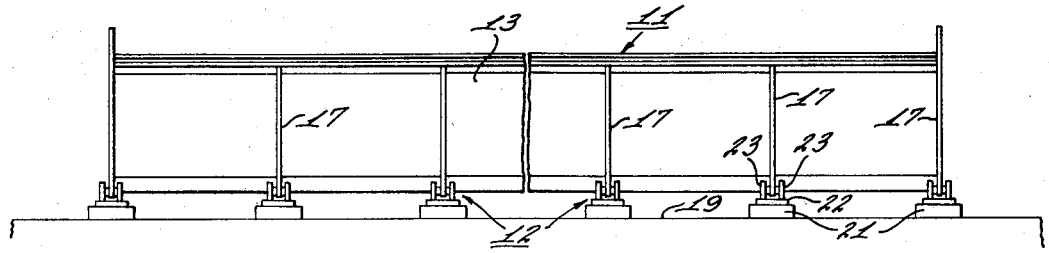
FIG. 1 is a front elevation of a crest gate aligned to its supporting journal bearings.
Figure 2:
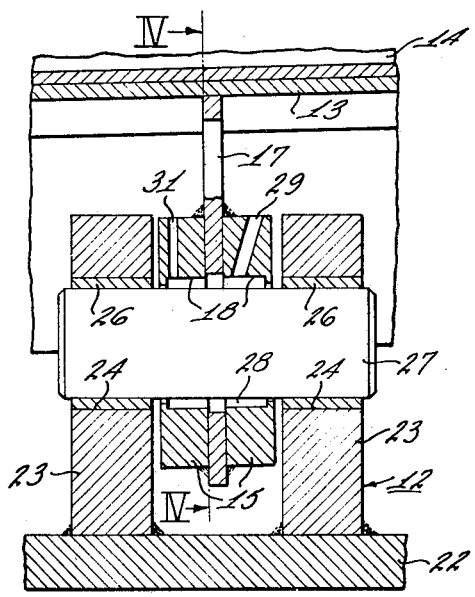
FIG. 2 is an enlarged view of one of the supporting journal bearings showing the gate positioned for attachment to the pivot pin.
Figure 3:
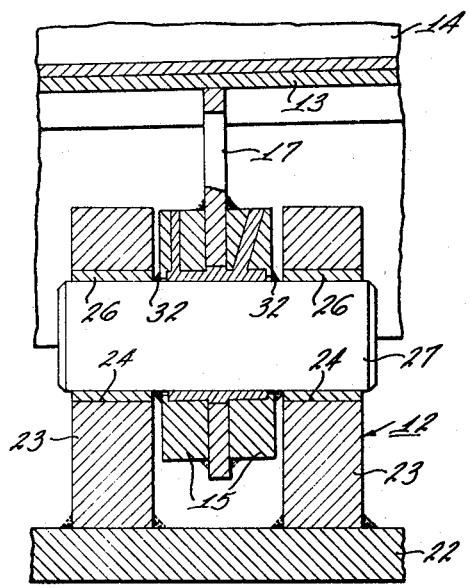
FIG. 3 is identical to FIG. 2 except that this figure shows the connection of the crest gate to the pivot pin; and, FIG. 4 is a cross section taken along the lines IV—IV of FIG. 2.
Figure 4:
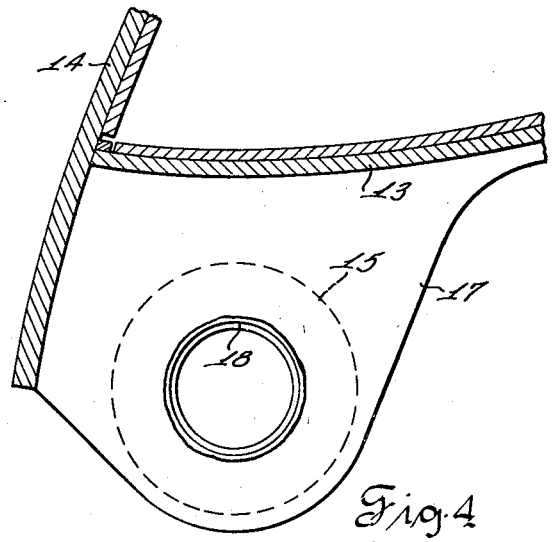

Referring to the drawings, the crest gate generally designated 11 is shown positioned for pivotal attachment to a series of longitudinally spaced and aligned journal bearings designated 12. The gate itself may be constructed in any conventional manner and is herein shown as having a curved backbone 13 and a lesser curved front portion 14 fabricated from steel plate. Supporting ribs 17 may be an integral part of the gate 11 and are spaced to coincide with the spacing of journal bearings 12. Support brackets or cheek plates 15 are rigidly connected to the support ribs 17 and are provided with oversized bores 18 therethrough.

The crest gate 11 is intended to be attached to the top of a dam or any other gate support 19 and for this purpose a series of bearing support blocks 21 may be provided. It is necessary that the bearing support blocks be level and accurately aligned and spaced. The journal bearings 12 may be removably attached to each bearing support block 21 in any conventional manner such as with bolts (not shown) through the flanges 22. Each journal bearing 12 may be provided with two spaced and upright support members 23 which are provided with accurately aligned pin receiving bores 24. These bores may be provided with any conventional bearing surface such as bronze bushings 26.

It is a relatively simple matter with the optical equipment now available to attach the support blocks 21 to the top of the dam 19 and to connect the journal bearings 12 thereto so that they are very accurately aligned with one another. However, it is a practical impossibility to accurately bore the cheek plates 15 with pin receiving holes and then accurately attach them to the crest gate. It might be possible to drill the pin receiving bores after the support flanges have been aligned to the gate, however, such a line boring operation would require an excessively large and expensive machine and the boring operation would be extremely difficult to accomplish.

As disclosed in prior patent, U.S. 3,126,614 to Frank J. Gross, on Mar. 31, 1964, the line boring operation was circumvented by partially assembling the crest gate at the factory and finally assembling the gate at the site. That method was an improvement over the line boring method even though it did require an additional assembly of the gate at the factory. The present method is a further improvement which overcomes the necessity of prior assembly at the factory.

After the journal bearings are accurately aligned and rigidly connected to the top of the dam, the crest gate is lowered into position. Each cheek plate bore is roughly aligned with the bearing support bores 24. Since the bores 18 in the cheek plates 15 are considerably larger than the bearing support bores, any misalignment between the gate and the journal bearings 12 can be accommodated. Pins 27 are then inserted through the bearing support bores 24 and the oversized bore in the cheek plates 15. The pins 27 and the inside surface of the oversized bores define an annular chamber 28. A fill hole 29 is provided through the cheek plate from its outer surface to this annular chamber 28. An air hole 31 is provided from the outside surface of the cheek plate to the chamber 28. At this time a dam 32 is provided about the pins 27 at the sides of the cheek plates. This dam may be in any form such as oakum wrapped around the shaft and forced into the space between the shaft and the cheek plate bore. With the dam in place, a liquid material which solidifies when cured is poured into the fill hole 29 filling the chamber 28. It should be understood that the word "cured" as used herein includes any process that causes a liquid to solidify including permitting a hot liquid metal to cool. The air within the chamber 28 is forced out the air hole 31. After the material has cured and solidified, a solid connection is provided between the crest gate and the pivot pins 27. The dam 32 is then removed and the gate is ready for operation.

Although only one embodiment of the subject invention has been herein shown and described, other embodiments will be obvious to those skilled in the art after reading this description and it is intended that all such modifications as come within a reasonable interpretation of the appended claim be covered.

The embodiments of the invention in which an exclusive property or privilege is claimed are defined as follows:

1. A method of pivotally connecting a gate structure having a plurality of spaced gate supporting ribs with enlarged aligned through holes to a gate support by means of pivot pins and support bearings comprising the steps of: rigidly connecting said support bearings to said gate support at spaced intervals equal to the spacing of said gate ribs so as to accurately align pin receiving bores in said support bearings; positioning said gate structure so that each enlarged hole is roughly aligned with said pin receiving bores; inserting said pivot pins through said bores and said enlarged holes; providing a dam about said pins so as to define a liquid confining chamber between said pins and said enlarged holes; pouring a liquid material which when cured will solidify into said chambers; and curing said liquid material to form a solid mass filling said chambers and supporting said gate structure on said pins.

References Cited

UNITED STATES PATENTS

| | | | |
|---|---|---|---|
| 339,036 | 3/1886 | Wilbur. | |
| 1,346,199 | 7/1920 | Hanson | 164—108 |
| 1,515,266 | 11/1924 | Mitchell. | |
| 2,346,291 | 4/1944 | Cisski | 29—434 |
| 2,689,459 | 9/1954 | Maye | 61—26 |
| 3,126,614 | 3/1964 | Gross | 29—149.5 |
| 3,185,531 | 5/1965 | Modrey. | |
| 3,409,967 | 11/1968 | Spier | 29—434 XR |

CHARLIE T. MOON, Primary Examiner

U.S. Cl. X.R.

29—460; 61—26; 164—108